(No Model.)
W. L. GORDON.
NUT LOCK.
No. 584,157. Patented June 8, 1897.
*Fig. I.*
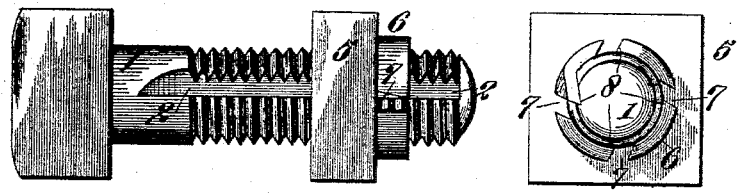
*Fig. II.*
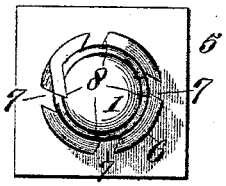
*Fig. III.*
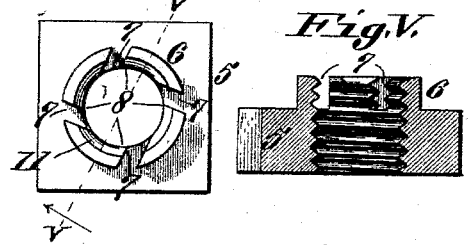
*Fig. IV.*
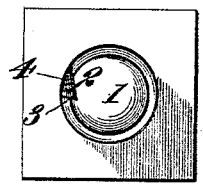
*Fig. V.*
*Fig. VI.*
*Fig. VII.*
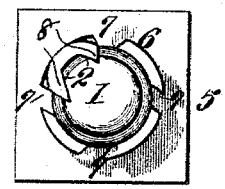
*Fig. IX.*
*Fig. VIII.*
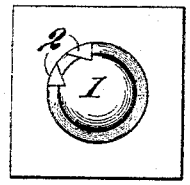
*Fig. X.*
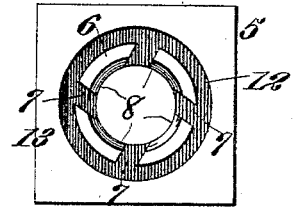
Attest:
E. S. Knight
B. L. Frederick
Inventor:
Wm. L. Gordon
By Wright Bro
attys

UNITED STATES PATENT OFFICE.

WILLIAM L. GORDON, OF HOT SPRINGS, ARKANSAS.

NUT-LOCK.

SPECIFICATION forming part of Letters Patent No. 584,157, dated June 8, 1897.

Application filed July 20, 1896. Serial No. 599,953. (No model.)

*To all whom it may concern:*

Be it known that I, WILLIAM L. GORDON, a citizen of the United States, residing at Hot Springs, in the county of Garland and State of Arkansas, have invented a certain new and useful Improvement in Nut-Locks, of which the following is a full, clear, and exact description, reference being had to the accompanying drawings, forming part of this specification.

My invention relates to certain improvements in nut-locks; and my invention consists in features of novelty hereinafter fully described, and pointed out in the claim.

Figure I is a side view illustrative of my invention. Fig. II is an end view. Fig. III is an end view of the nut. Fig. IV is an end view of the bolt. Fig. V is a section taken on line V V, Fig. III. Fig. VI is a side view of a key or wedge for unlocking the nut when it is desired to do so. Fig. VII is an end view of a bolt and nut, showing a modification. Fig. VIII is an end view of the bolt shown in Fig. VII. Fig. IX is a section of the nut, showing another modification. Fig. X is an end view of the nut shown in Fig. IX.

Referring to the drawings, 1 represents a bolt having a longitudinal groove 2. The groove, as shown in Fig. IV, is made with a straight or slightly-undercut side 3 and an inclined or tapering side 4.

5 represents the nut. The nut is provided with an annular flange 6, divided into sections or wings by means of cuts or slots 7, made on an inclination to the axis of the nut—in other words, parallel to a tangent to the central hole in the nut away from the axis, so as to provide each section or wing of the flange with an acute-angular corner 8, that may be pressed or forced down into the groove 2 in the bolt when the nut has been tightened, the nut being thus held to its adjustment in a permanent and secure manner. The forcing of the corner 8 of the wing or section of the flange that may happen to be opposite the groove 2 when the nut is screwed up is accomplished by simply striking the corner of the wing with a hammer or other tool, which depresses the corner of the wing into the groove in the bolt in the manner shown in Fig. II. By making the wall 3 of the groove straight or slightly undercut the depressed wing of the flange of the nut will have a firm bearing, that will prevent the backward turning of the nut, while making the face 4 of the groove 2 inclined enables the further tightening of the nut after it has been once locked, as the depressed corner of the wing will ride up over the incline of the groove.

When it is desired to remove the nut, it may be done by raising the depressed corner of the wing out of the groove of the bolt. This may be accomplished by a wedge 9, (shown in Fig. VI,) having a chisel end 10. The inner face of the outer end of the flange 6 of the nut is reamed out, as shown at 11, Fig. III, and by placing the wedge 9 on the groove 2 of the bolt, with the incline of the end 10 against the reamed face of the inbent corner of the wing of the flange 6, and then striking the outer end of the wedge the corner of the wing will be raised out of the groove 2 of the bolt, when the nut may be unscrewed or removed.

In Figs. VII and VIII, I have shown a modification wherein the bolt is provided with two grooves 2, into which both ends of one of the wings or sections of the flange 6 may be forced to form a double lock.

In Figs. IX and X, I have shown a modification of the nut wherein the flange 6 is formed by cutting a groove 12 in the outer face of the nut; or, in other words, the nut has a portion 13 that overhangs the flange 6.

I am aware of Patent No. 278,248, issued to A. B. Lipsey May 22, 1883, and I am also aware of Patent No. 225,121, issued to Hackman and Tinsley March 2, 1880, and I make no claim to anything therein shown and described.

What I claim, and desire to secure by Letters Patent, is—

The combination of a bolt having a longitudinal groove formed with faces 3 and 4, and a nut having a flange 6 divided into sections by slots or cuts 7 made parallel to a tangent to the central hole in the nut, substantially as set forth.

WM. L. GORDON.

In presence of—
G. M. MILLMINE,
J. L. BENTZ.